(12) United States Patent
Müller et al.

(10) Patent No.: US 6,988,419 B2
(45) Date of Patent: Jan. 24, 2006

(54) FLOWMETER WITH MEANS FOR APPLYING A COUNTERFORCE UPON AN INTEGRATED FLOATING BODY

(75) Inventors: Fritz Müller, Ingelfingen (DE); Klaus Heger, Ingelfingen (DE)

(73) Assignee: GEMÜ Gebrüder Müller Apparatebau GmbH & Co. KG, Ingelfingen (DE)

( * ) Notice: Subject to any disclaimer, the term of this patent is extended or adjusted under 35 U.S.C. 154(b) by 0 days.

(21) Appl. No.: 10/299,591

(22) Filed: Nov. 19, 2002

(65) Prior Publication Data

US 2003/0110868 A1 Jun. 19, 2003

Related U.S. Application Data

(63) Continuation of application No. PCT/EP01/05533, filed on May 15, 2001.

(30) Foreign Application Priority Data

May 19, 2000 (DE) .......................... 200 09 024 U

(51) Int. Cl.
*G01F 1/22* (2006.01)
(52) U.S. Cl. .................................... 73/861.57
(58) Field of Classification Search .............. 73/861.57
See application file for complete search history.

(56) References Cited

U.S. PATENT DOCUMENTS

| | | | |
|---|---|---|---|
| 3,776,036 A * | 12/1973 | Taylor ..................... | 73/861.58 |
| 3,889,535 A | 6/1975 | Bull et al. | |
| 3,979,955 A | 9/1976 | Schulte et al. | |
| 4,573,361 A * | 3/1986 | Kobold ..................... | 73/861.71 |
| 4,896,534 A | 1/1990 | Daly | |
| 4,938,078 A | 7/1990 | Kobold | |
| 5,078,004 A | 1/1992 | Nyseth | |
| 5,086,654 A * | 2/1992 | Malminen ................ | 73/861.58 |
| 5,417,078 A * | 5/1995 | Huenniger et al. ........... | 62/218 |
| 5,515,734 A * | 5/1996 | Malminen ................ | 73/861.46 |
| 5,554,805 A * | 9/1996 | Bahrton ....................... | 73/202 |
| 5,655,568 A * | 8/1997 | Bhargava et al. ......... | 73/861.57 |
| 5,717,137 A * | 2/1998 | Singleterry et al. ...... | 73/861.58 |

* cited by examiner

*Primary Examiner*—Harshad Patel
(74) *Attorney, Agent, or Firm*—Henry M. Feiereisen

(57) ABSTRACT

A flowmeter includes a floating body which floats freely in a stream in a measuring tube, and is acted upon by a flowing force, buoyancy and a weight. In order to generate a counterforce, a measuring spring is fixedly connected to the floating body. The floating body is preferably self-stabilized through a selection of corresponding geometrical relationships. The measuring spring can optionally be rotatably supported on the floating body and/or the measuring tube. The floating body is suitably made of light weight plastic material, so that the density (mass/volume) of the floating body matches the density of the flowing medium.

13 Claims, 3 Drawing Sheets

FLOWMETER WITH MEANS FOR APPLYING A COUNTERFORCE UPON AN INTEGRATED FLOATING BODY

CROSS-REFERENCES TO RELATED APPLICATIONS

This application is a continuation of prior filed copending PCT International application no. PCT/EP01/05533, filed May 15, 2001, which was not published in English and which designated the United States and on which priority is claimed under 35 U.S.C. §120, the disclosure of which is hereby incorporated by reference.

This application claims the priority of German Patent Application, Serial No. 200 09 024.0, filed May 19, 2000, pursuant to 35 U.S.C. 119(a)–(d), the disclosure of which is incorporated herein by reference.

BACKGROUND OF THE INVENTION

The present invention is directed to a flowmeter with a floating body which floats freely in a stream in a measuring tube and is acted upon by a flowing force, buoyancy and a weight.

It has been known for a long time to provide flowmeters with a freely floating floating body without guide rods, guide ribs, guide surfaces or the like. For improving self-stability thereof, the floating body may be caused to rotate. In such a flowmeter, the weight of the floating body acts counter to the sum of flowing force and buoyancy, and the lift of the floating body is used to carry out the flow measurement via a measuring scale starting from a zero position. Hereby, the weight of the used material restricts the floating body, and oftentimes flowmeters have to be used with a measuring tube of greater width than the associated line.

In addition, so-called spring washer type flowmeters are known. Hereby, the sum of flowing force and buoyancy counteracts a spring on a measuring disk and the weight of the measuring disk. The measuring disk is arranged together with the spring centrally in longitudinal direction in the measuring tube upon a guide rod for movement therealong. Frictions, caused as a result of the guide rod, adversely affect the measuring accuracy, and situations may also be encountered in which the measuring disk with the spring seize upon the guide rod so that the flowmeter is no longer operational.

The invention is directed to overcome the afore-stated difficulties and to provide a flowmeter which enables a reliable flow measurement while being of smallest possible dimension and without risk of obstruction by guide means or the like.

It would therefore be desirable and advantageous to provide an improved flowmeter which obviates prior art shortcomings and which enables a reliable flow measurement while being of smallest possible dimension and without risk of obstruction by guide means or the like.

SUMMARY OF THE INVENTION

According to one aspect of the present invention, a flowmeter includes a measuring tube, a floating body which floats freely in a medium stream in the measuring tube and is acted upon by a flowing force, buoyancy and a weight; and a spring fixedly connected to the floating body for generating a counterforce against the flowing force, against buoyancy and against weight.

Since the flowmeter is devoid of any guide means for the floating body in the stream in the measuring tube, as a consequence of attachment of the spring to the floating body, the drawbacks caused by friction or obstruction upon the guide means can be eliminated. As a result, the operational reliability of such a flowmeter is substantially improved. Moreover, the measuring range can be easily changed over a wide range through respective selection of suitable springs, resulting in an adaptation to the maximum flow rate of a line. In particular, the measuring tube of the flowmeter can have the same nominal width as the associated line, such as a conduit or the like, and thus, the flowmeter according to the invention occupies an extremely small structural space. The dimensions can therefore be reduced compared to a conventional floating body type flowmeter.

Moreover, the flowmeter according to the invention is also suitable for use in an application in which the flow is realized from top to bottom. Of course, the flow to be detected is always directed against the pointed end of the floating body.

According to another feature of the present invention, the spring may be connected with the floating body in such a way that the spring is almost completely received in the floating body or completely surrounded by it, when the floating body assumes the zero position. Thus, the connection point of spring and floating body is always protected from the flowing medium. Also, the structural length of a flowmeter according to the invention can hereby be reduced.

Preferably, the floating body is of self-stabilizing configuration. This can be realized with the assistance of geometric means. This self-stabilization results in a very calm behavior in the stream so that the need for upstream calming paths ahead of the flowmeter is no longer required.

The stabilization can further be enhanced by rotatably supporting the spring upon the floating body or the measuring tube.

In order to realize the embodiment according to the invention with a smallest possible moving mass for improving the inherent dynamics of the flow meter, the floating body is made for weight reasons of lighter material which should also be easy to handle. Hereby, in particular plastic material is considered. Preferably, the density (mass/volume) of the floating body should match the density of the flowing medium.

The present invention resolves prior art shortcomings by providing a flowmeter which includes a floating body which floats freely and has no guide means and to which a spring is fixedly connected for generating a counterforce against the sum of flowing force, against buoyancy, against weight. This combination results in a flowmeter, which is reliable in operation while yet being substantially independent on the alignment of the measuring tube, and enables a simple adaptation to the respectively desired different measuring ranges that can be realized through suitable selection of the spring. As a consequence, a flowmeter may be used universally in line systems.

The present invention resolves prior art shortcomings by providing a flowmeter which includes a floating body which floats freely and has no guide means and to which a measuring spring is fixedly connected for generating a counterforce against the sum of flowing force, against buoyancy, against weight. This combination results in a flowmeter, which is reliable in operation while yet being substantially independent on the alignment of the measuring tube, and enables a simple adaptation to the respectively desired different measuring ranges that can be realized through suitable selection of the measuring spring. As a consequence, a flowmeter may be used universally in line systems.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
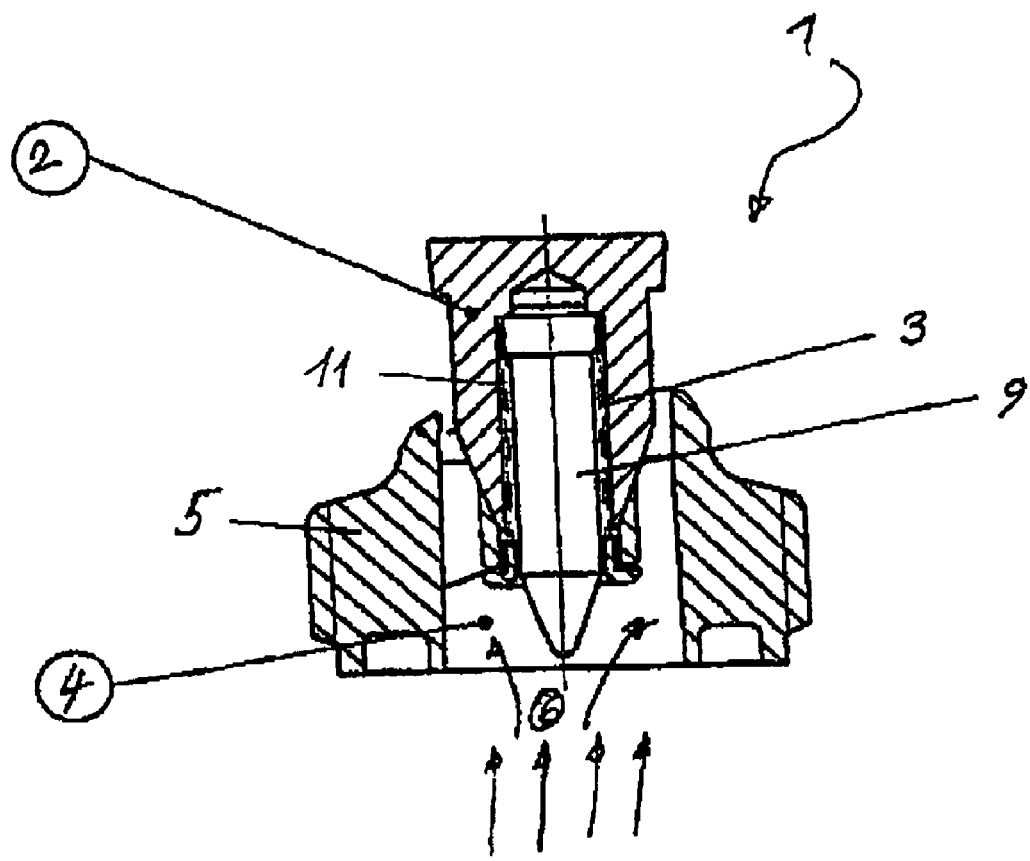
FIG. 1 shows a longitudinal section of a flowmeter in zero position.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a longitudinal section of a flowmeter generally designated by reference numeral 1. The flowmeter 1 includes a measuring tube which is not shown in more detail in FIG. 1 and has a conical or cylindrical configuration and which is passed by a medium. Disposed in the measuring tube, passed by the medium, is a floating body 2 for freely floating therein. Acting on this floating body 2 are a flowing force, buoyancy and its weight.

To generate a counterforce to the sum of flowing force, buoyancy and weight, the floating body 2 is fixedly connected to a spring 3. The spring 3 determines hereby the measuring range of the flowmeter 1, and other measuring ranges can be realized through simple selection of respective springs 3. Hereby, adaptation to the maximum flow rate in an associated and not shown line, such as a conduit, can be implemented.

In the zero position of the floating body 2, shown in FIG. 1, the measuring spring 3 is almost completely received in a cavity 11 of the floating body and, corresponding to the lift of the floating body 2, the measuring spring 3 is then more or less stretched in corresponding manner to emerge from the floating body 2. The floating body 2 has a self-stabilizing configuration which can be realized through provision of notches or the like, and in particular, the floating body 2 has an outer contour that promotes stabilization.

The stability of the floating body 2 can be further improved by rotably supporting the spring 3 upon the floating body 2 or upon the measuring tube which is not shown in more detail.

In particular, the floating body 2 is made for weight reasons of a light material which can easily be handled in particular by machine. Plastic material is in particular considered here. Preferably, the floating body should have the same density (mass/volume) as the flowing medium.

This floating body 2 is, as shown, disposed in a circulated cross section 4. This circulated cross section 4 in the not shown measuring tube is limited by a respective insert 5. The measuring tube may have a conical or cylindrical configuration.

For measuring the flow in FIG. 1 from bottom to top (stream 6), the freely floating floating body 2 moves into the measuring tube in dependence on the magnitude of the flow, and the floating body assumes a respective position of equilibrium, when the flow is constant, in which position the sum of the flowing force, boyancy and weight is in balance to the counter force generated by the spring 3. The stream 6 is always directed against the pointed end of the floating body 2. The device itself may, however, be installed in any disposition when weight and buoyancy of the floating body 2 are of same magnitude and thus measurement may be realized in any flow direction. By providing the measuring tube, not shown in FIG. 1, with respective scales through providing respective scaling, the flow rates at the measuring tube of the flowmeter 1 can be read. The freely floating floating body 2 moves in the stream within the measuring tube according to the flow rate through a not shown line, such as a conduit, respectively connected to the flowmeter. The flowmeter 1 allows a reliable and acurate measurement of the flow rate, and the flowmeter is configured in a particular compact design and may be dimensioned with a same diameter as the nominal width of the associated lines. The flowmeter 1 may be turned by 90° or 180° for horizontal or vertical stream from top to bottom.

Figure 2:
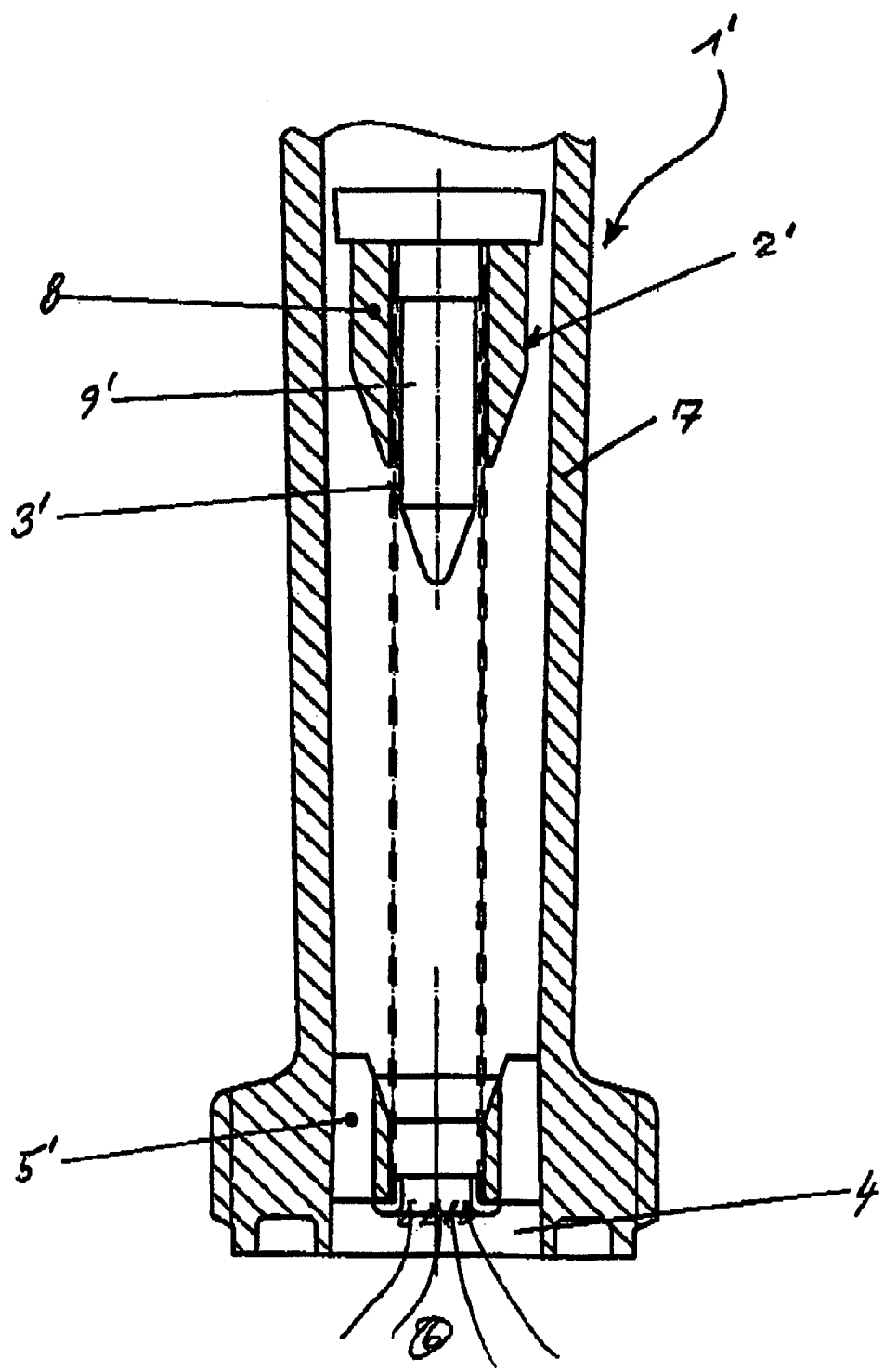
FIG. 2 shows a longitudinal section of a modified embodiment of a flowmeter in a measuring position or operating position.

FIG. 2 shows a modified embodiment of a flowmeter 1' in an operative position in which a flow rate is measured in a measuring tube 7 in a position of equilibrium. Same or similar parts corresponding to the embodiment shown in FIG. 1 am indicated by same reference characters followed by an additional"'". Placed in the measuring tube 7 at one end thereof is an insert 5' The floating body 2' includes a sleeve 8 in which a floating body element 9 is clamped at interposition of the spring 3'. The other end of the spring 3' is secured to the insert 5'.

Figure 3:
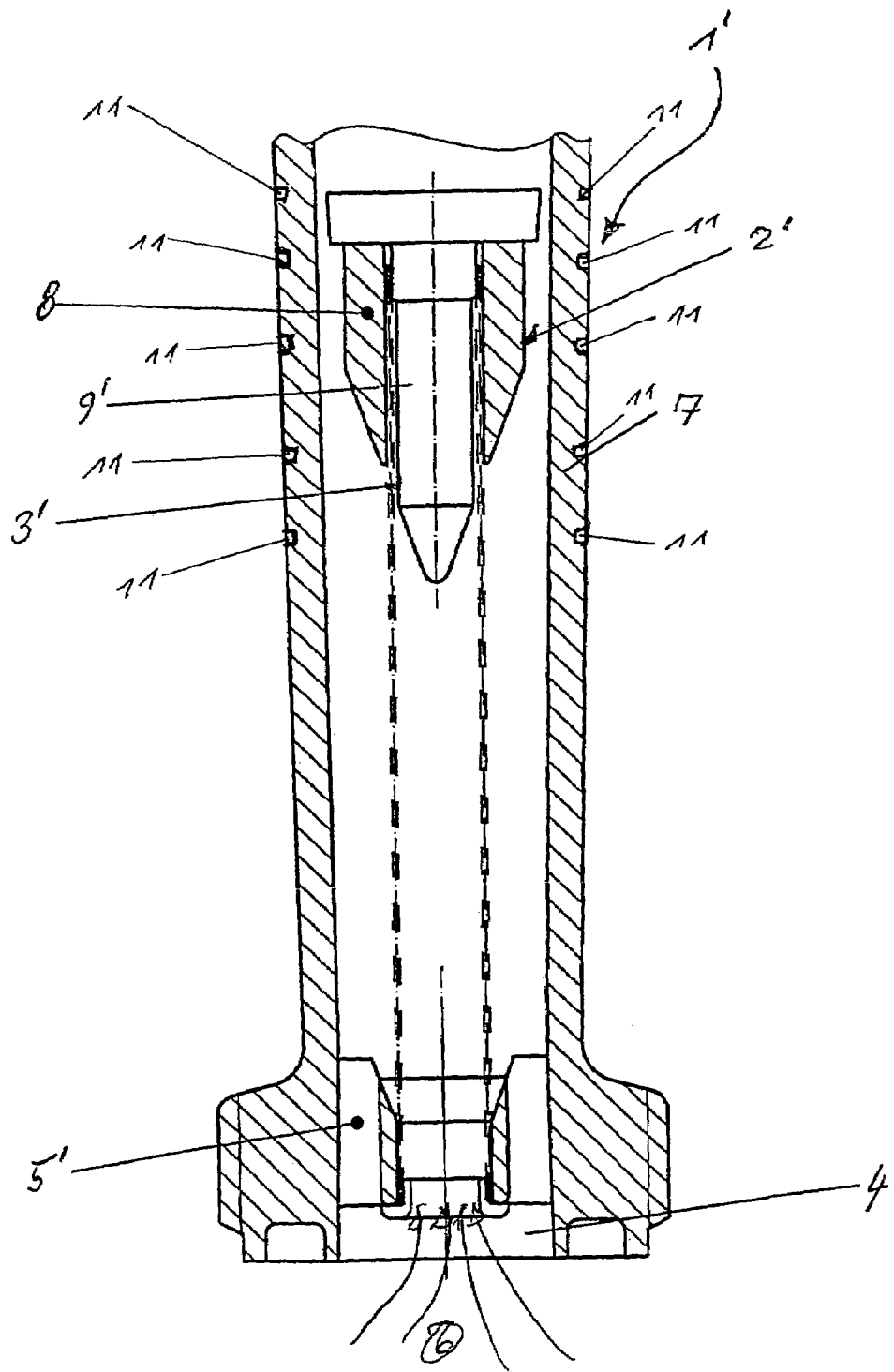
FIG. 3 shows a longitudinal section of the flowmeter of FIG. 2 with provision of a measuring scale.

Apart from these structural differences, function and operation of the flowmeter 1 corresponds to the previously described first embodiment of the flowmeter 1. In addition, as shown in FIG. 3, and noted above, the measuring tube 7 can be provided with a respective scale through providing respective scaling 11 so as to be able to read the flow rates at the measuring tube 7 of the flowmeter 1.

Of course, the invention is not limited to the preferred embodiment shown in the drawing and to the afore-described particulars. Rather, there may be numerous changes and modifications at the disposal of the artisan without departing from the spirit of the invention. For example, the spring 3 may be connected to the floating body 2 in a manner that is different than shown, and it is not necessarily required that the spring 3 is surrounded by the floating body 2, when the latter assumes the zero position. The freely floating and self-stabilizing floating body 2 of the flowmeter I according to the invention assumes the guide function of the spring 3 during movement in the stream within the measuring tube, Since the floating body 2 has a very good inherent stability, upstream calming paths may be omitted in the line system, resulting in significant simplifications.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A flowmeter, comprising:
   a measuring tube;
   a floating body which floats freely in a medium stream in the measuring tube and is acted upon by a flowing force, buoyancy and a weight, said floating body having a sleeve, and a floating body element received in the sleeve, thereby defining a cavity between the sleeve and the floating body element; and
   a spring fixedly connected to the floating body and extending in flow direction of the medium stream for generating a counterforce against the flowing force, against buoyancy and against weight, wherein the spring is received in the cavity of the floating body in surrounding relationship to the floating body element.

2. The flowmeter of claim 1, wherein the spring is so connected to the floating body as to be substantially received in the floating body, when the floating body assumes a zero position.

3. The flowmeter of claim 1, wherein the floating body has a self-stabilizing configuration.

4. The flowmeter of claim 1, wherein the spring is rotatably supported by the floating body.

5. The flowmeter of claim 1, wherein the spring is rotatably supported by the measuring tube.

6. The flowmeter of claim 1, wherein the floating body is made of plastic material.

7. The flowmeter of claim 1, wherein the floating body has a density which matches a density of the medium.

8. The flowmeter of claim 1, wherein the measuring tube has a conical configuration.

9. The flowmeter of claim 1, wherein the measuring tube has a cylindrical configuration.

10. The flowmeter of claim 1, wherein the spring extends in parallel relationship to the floating body.

11. The flowmeter of claim 1, wherein the measuring tube includes a scale for measuring a flow rate.

12. The flowmeter of claim 1, wherein the spring is substantially received in the cavity of the floating body, when the floating body assumes a zero position.

13. The flowmeter of claim 1, wherein the measuring tube is provided with a scaling for indicating a flow rate.

* * * * *